(12) United States Patent
Chen et al.

(10) Patent No.: US 7,950,130 B2
(45) Date of Patent: May 31, 2011

(54) METHOD FOR MAKING AN INSPECTION FIXTURE, AND MOLD ASSEMBLY USED IN THE METHOD

(75) Inventors: Ping Chen, Shenzhen (CN); Lei Li, Shenzhen (CN); Yan-Hua Xing, Shenzhen (CN); Wen-Quan Xu, Shenzhen (CN); Chang-Fa Sun, Shenzhen (CN); Lin-Sen Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1203 days.

(21) Appl. No.: 11/610,349

(22) Filed: Dec. 13, 2006

(65) Prior Publication Data
US 2007/0222115 A1   Sep. 27, 2007

(30) Foreign Application Priority Data
Mar. 8, 2006  (CN) .......................... 2006 1 0034227

(51) Int. Cl.
*B23P 25/00* (2006.01)
(52) U.S. Cl. ..................... 29/527.1; 29/527.2; 29/527.3; 249/64; 249/151; 249/176; 264/239; 264/273; 264/299
(58) Field of Classification Search ................. 29/527.1, 29/527.3, 527.2; 264/239, 273, 299; 249/64, 249/151, 176
See application file for complete search history.

(56) References Cited

U.S. PATENT DOCUMENTS

| 3,487,539 | A   | * | 1/1970  | Dugan et al. ..................... 29/600 |
| 4,850,060 | A   | * | 7/1989  | Chieng Ming ..................... 4/237 |
| 5,548,675 | A   | * | 8/1996  | Shigematsu et al. ............ 385/80 |
| 6,623,678 | B2  | * | 9/2003  | Anderson ..................... 264/162 |
| 6,626,468 | B2  | * | 9/2003  | Ogawa ........................ 285/125.1 |
| 6,903,457 | B2  | * | 6/2005  | Nakajima et al. .............. 257/717 |
| 7,076,857 | B2  | * | 7/2006  | Yang ............................. 29/527.3 |
| 7,798,797 | B2  | * | 9/2010  | Tabata .......................... 425/116 |
| 2006/0277743 | A1 | * | 12/2006 | Goto .............................. 29/527.1 |

FOREIGN PATENT DOCUMENTS

| CN | 2698564 Y  | 5/2005 |
| CN | 2707470 Y  | 7/2005 |
| JP | 61-100424 A | 5/1986 |

* cited by examiner

*Primary Examiner* — Derris H Banks
*Assistant Examiner* — Azm Parvez
(74) *Attorney, Agent, or Firm* — Frank R. Niranjan

(57) ABSTRACT

In a method for making an inspection fixture, a detachable mold assembly (20) and a hardenable fluid are firstly prepared. Secondly, the hardenable fluid is poured into the mold assembly, and a plurality of molding pins (23) are inserted into the mold assembly. Thirdly, a main body (21) with a plurality of positioning holes (2122) corresponding to the molding pins (i.e., the locations thereof) are formed in the mold after the hardenable fluid hardens. Fourthly, the mold assembly is detached, and the part is removed from the mold. Finally, a plurality of positioning pins is mounted into the positioning holes of the molded part, the positioning holes having remained upon removal of the molding pins.

11 Claims, 4 Drawing Sheets

METHOD FOR MAKING AN INSPECTION FIXTURE, AND MOLD ASSEMBLY USED IN THE METHOD

TECHNICAL FIELD

The present invention generally relates to methods for making an inspection fixture and, more particularly, to a method for making fixtures via a quick molding process and a mold assembly for use in such a method.

BACKGROUND

Many covers for mobile devices are manufactured with complicated shapes. Quality control of these covers generally involves checking whether the covers match with a standard product. Thus, inspection fixture tools are needed to measure the covers. Typical inspection fixtures have a plurality of pins for positioning the covers being inspected. The accuracy of the measurement of the covers may vary with the accuracy of the inspection fixtures and the pins. Many methods, such as computerized numerical control process, rapid prototyping, and quick molding, are used in small batch production of the inspection fixtures required with high accuracy.

Computerized numerical control processes are effective in production of inspection fixtures, however, in batch-scale production it can be costly and time consuming. In the new technology of rapid prototyping, a thin layer of metallic powder is spread over a platform and sintered into place by a laser beam controlled by a computer which creates the required shape from data stored in a CAD system. Thus, three-dimensional geometry can be constructed layer by layer in every detail, enabling even highly complex parts and tools to be built up in a quick and fully automated process. However, rapid prototyping requires expensive specialized equipment. Quick molding is a method in which a product can be molded in a simple mold by pouring a hardenable fluid into the mold. However, the accuracy of the inspection fixtures and distance between the pins may be seriously affected by contraction of the fluid.

Therefore, a method for making an inspection fixture is desired in order to overcome the above-described shortcomings.

SUMMARY

In one embodiment, a method for making an inspection fixture is provided. Firstly, a detachable mold assembly and a hardenable fluid are prepared. Secondly, the hardenable fluid is poured into the mold assembly, and a plurality of molding pins are inserted into the mold assembly. Thirdly, a part with a plurality of positioning holes corresponding to the molding pins is formed in the mold after the hardenable fluid hardens/solidifies. Fourthly, the mold is detached, and the part is removed/separated from the mold assembly. Finally, a plurality of positioning pins is mounted into the positioning holes of the part.

Other advantages and novel features will become more apparent from the following detailed description of a preferred embodiment when taken in conjunction with the accompanying drawings.

BRIEF DESCRIPTION OF THE DRAWINGS

Many aspects of the method for making an inspection fixture can be better understood with reference to the following drawing. The components in the drawings are not necessarily drawn to scale, the emphasis instead being placed upon clearly illustrating the principles of the method for making an inspection fixture. Moreover, in the drawings, like reference numerals designate corresponding parts throughout a plurality of views.

DETAILED DESCRIPTION OF THE PREFERRED EMBODIMENT

Figure 1:
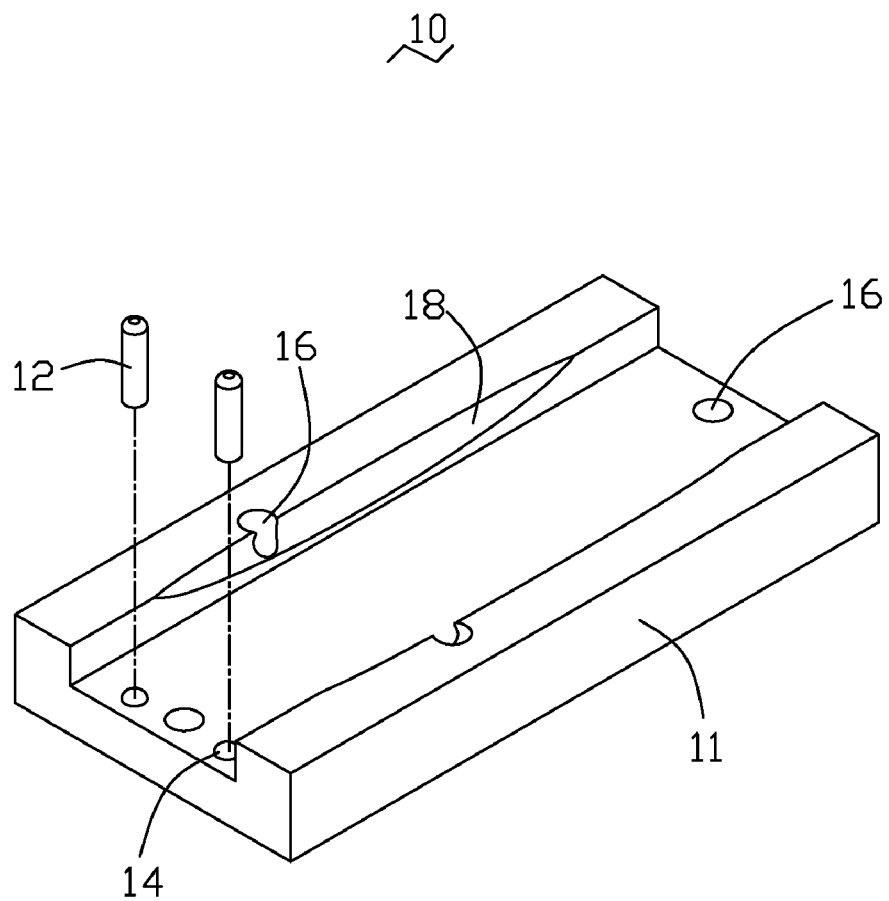
FIG. 1 is a schematic view of an inspection fixture, according to a preferred embodiment.

Referring to FIG. 1, a method in a preferred embodiment is suitable for production of an inspection fixture 10. The inspection fixture 10 includes a main body 11 with a portion matching a cover and a plurality of positioning pins 12. A plurality of positioning holes 14, observation holes 16 and curved grooves 18 are formed in the main body 11. The positioning pins 12 are engaged in the positioning holes 14.

Figure 2:
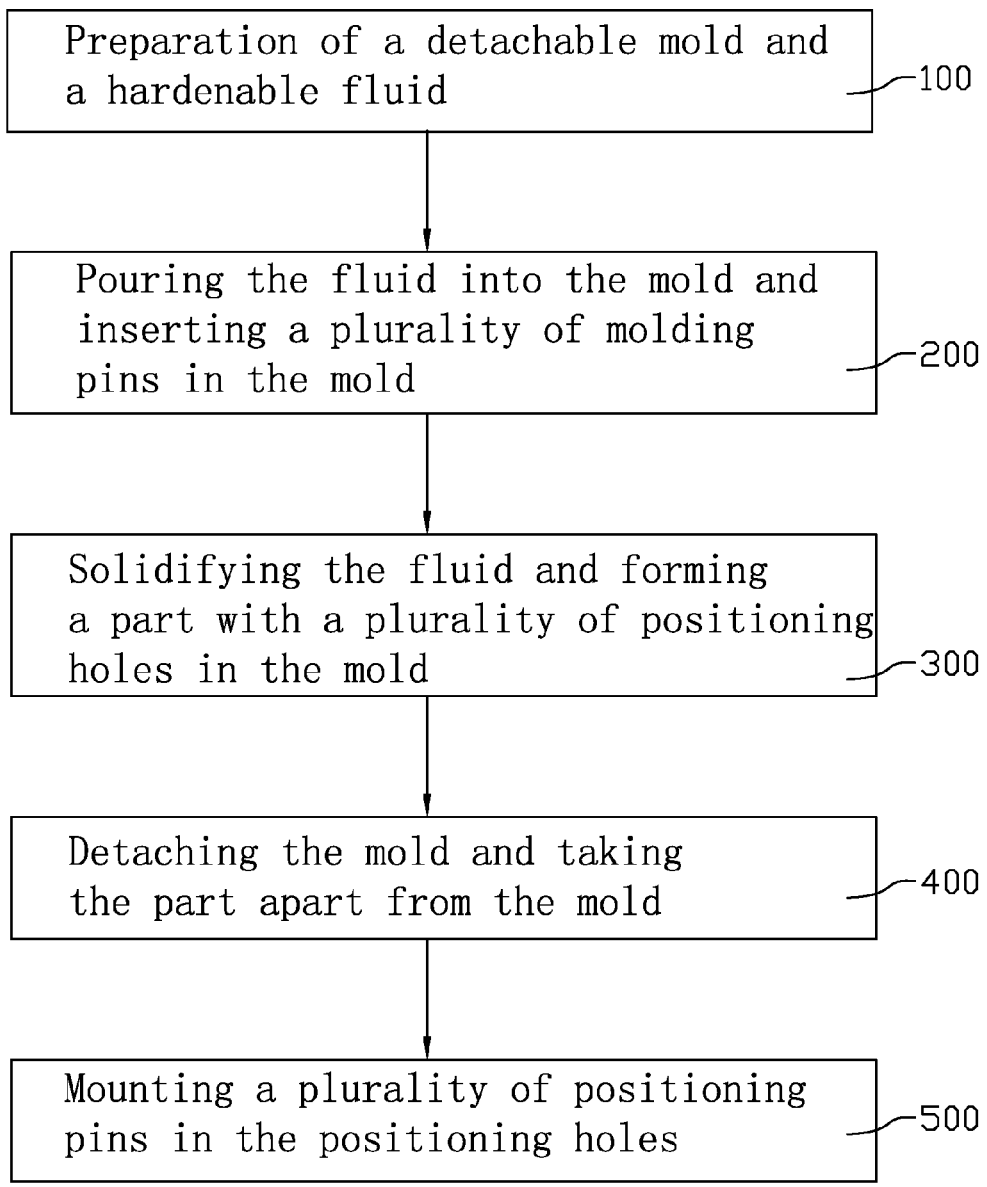
FIG. 2 is a flow chart of a method for making the inspection fixture, in accordance with the preferred embodiment.

Referring to FIG. 2, the method including steps 100 to 400. In step 100, a detachable mold and a hardenable fluid are prepared. In step 200, the hardenable fluid is poured into the mold, and a plurality of molding pins are inserted into the mold. In step 300, a part with a plurality of positioning holes, corresponding to the molding pins, is formed in the mold after the hardenable fluid is solidified. In step 400, the mold is detached, and the part is taken apart from the mold. In step 500, a plurality of positioning pins 12 are mounted into the positioning holes of the molded part to form the inspection fixture 10.

Figure 3:
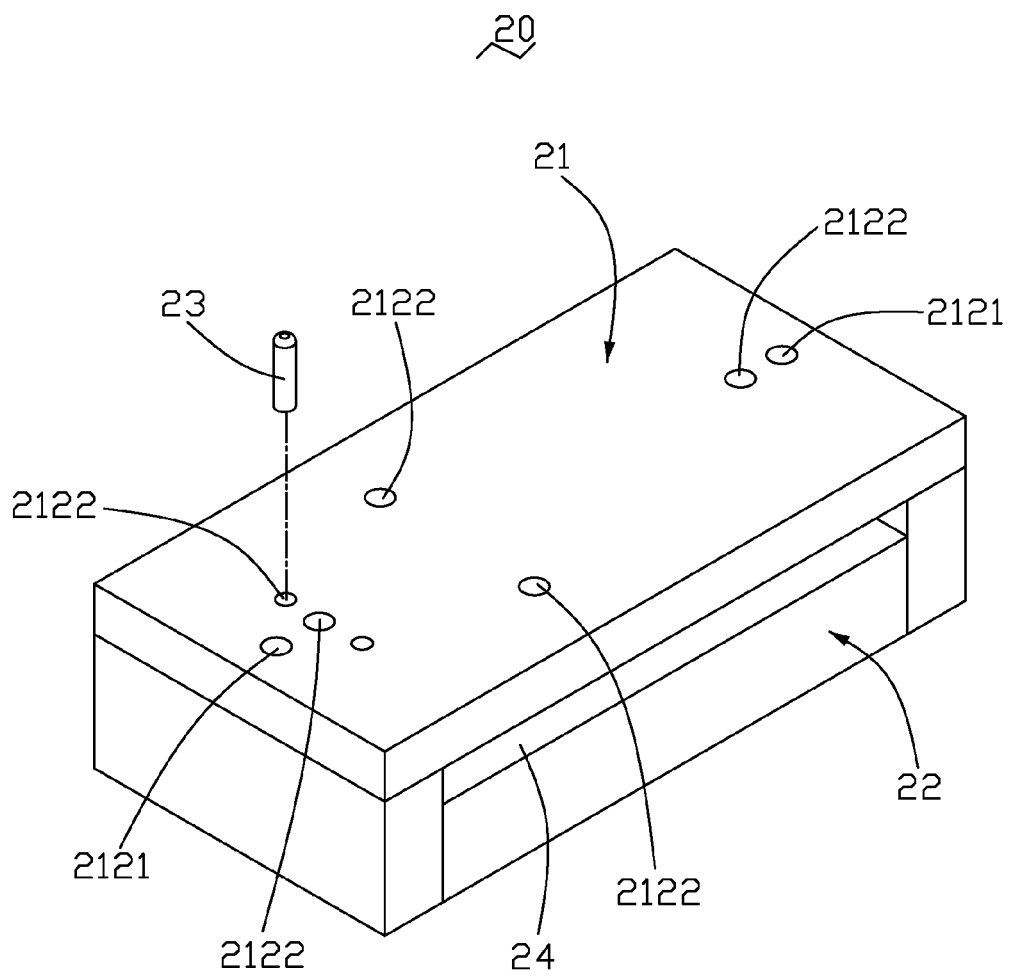
FIG. 3 is a schematic view of a mold assembly used in the method of FIG. 2.
Figure 4:
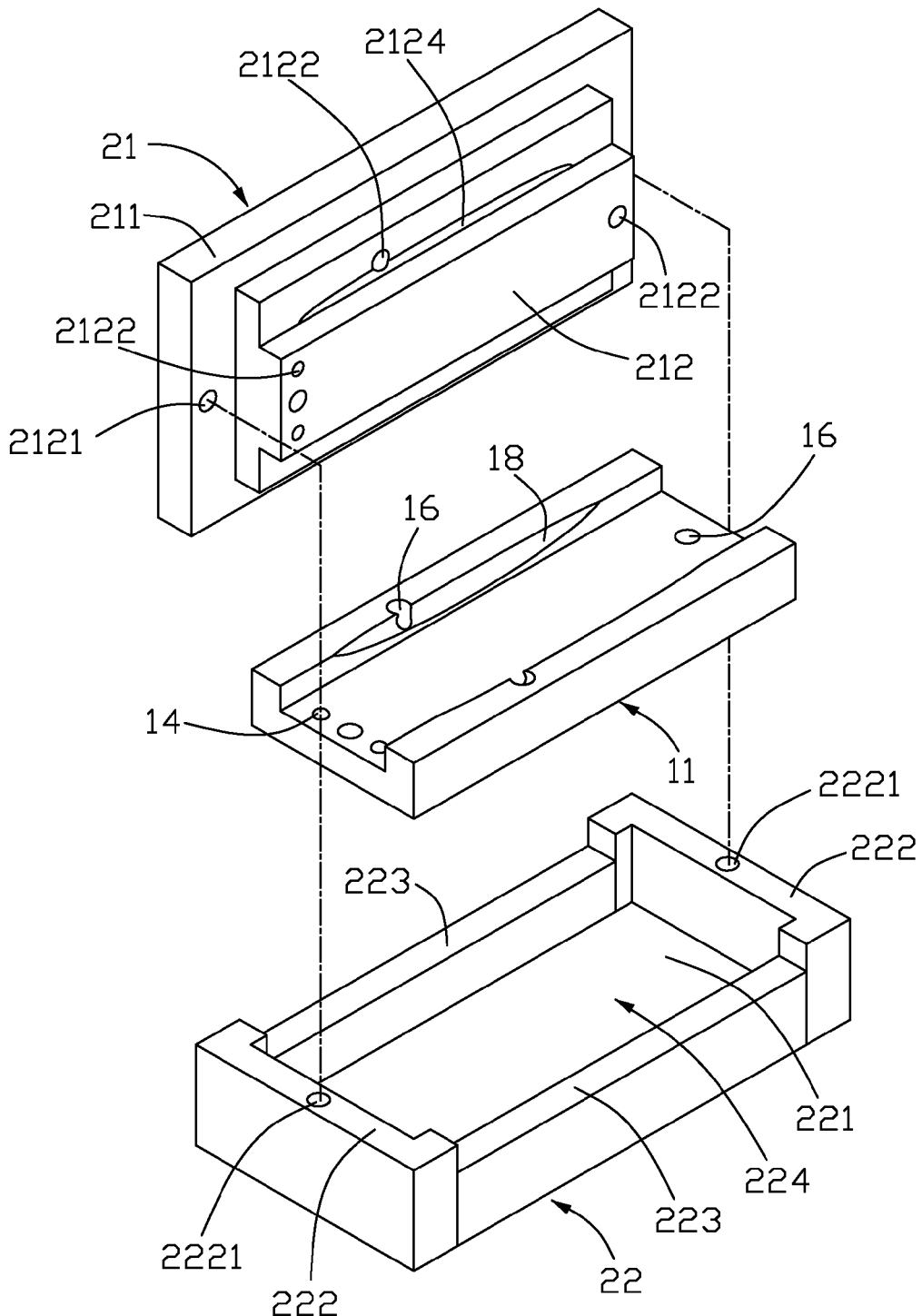
FIG. 4 is an exploded view of the mold assembly shown in FIG. 3.

Referring to FIG. 3 and FIG. 4, a mold assembly 20 used in the method is provided. The mold assembly 20 includes a male mold part 21, a detachable female mold part 22, and a plurality of molding pins 23 (only one shown in drawings). The male mold part 21 can be made, e.g., of aluminum. The male mold part 21 includes a mold plate 211 and a mold core 212 formed on the mold plate 211. Two first threaded holes 2121 are defined in the male mold plate 212 and are positioned adjacent to two ends of the mold core 212, respectively. The mold core 212 has a plurality of receiving holes 2122 defined therein. The receiving holes 2122 run (i.e., extend) through the mold core 212 and the male mold plate 211 and are used for receiving the molding pins 23. Two curved portions 2124 are formed on two opposite sides of the mold core 212 and are together configured (i.e., structured and arranged) for forming a part with two curved grooves. The female mold part 22 is made of, e.g., steel. The female mold part 22 includes a bottom plate 221, two opposite first side plates 222, and two opposite second side plates 223. The two first side plates 222 and two second side plates 223 are detachably joined with the bottom plate 221 and define a mold cavity 224 corresponding to the mold core 212. Each first side plate 222 has a second threaded hole 2221 corresponding to the first threaded hole 2122. The two second side plates 223 are lower than the first side plates 222. Thus, a gap 24 can be defined between the two second side plates 223 and the male mold plate 212 when the mold part 21 covers the female mold parts 22. The molding pins 23 can be fixed in the receiving holes 2122 of the male mold part 21 and are used to form the positioning holes 14 or the observation holes 16 of the inspection fixture 10.

The hardenable fluid can, advantageously, be a melted resin and preferably should be a resin with a total contraction ratio in an approximate range from 0.1 to 0.4%. The hardenable fluid can also be gypsum ($CaSO_4 \cdot 2H_2O$).

Firstly, the hardenable fluid is agitated in a vacuum to expel air contained in the fluid. After the hardenable fluid has been agitated, the fluid is poured into the mold cavity 224 of the female mold part 22 in a vacuum. The male mold part 21 is then placed on the female mold part 22, with each first threaded hole 2121 aligning with a corresponding second threaded hole 2221. The male mold part 21 and the female mold part 22 are joined together with a bolt (not shown in drawing) threaded into each first threaded hole 2122 and their corresponding second threaded holes 2221. A superfluous (i.e., extra) amount of hardenable fluid can be expelled from the mold cavity 224 via the gap 24.

Secondly, the molding pins 23 are inserted into the receiving holes 2122 and extend into the mold cavity 224.

Thirdly, the mold assembly 20 is placed at room temperature for about one hour in order to permit the hardenable fluid to solidify. A molded main body 11 of the inspection fixture 10 can be formed in the mold assembly 20 after the solidification is completed. It is to be understood that if a curable (e.g., heat, UV, etc.) fluid could be used as the hardenable fluid, and, in such case, an appropriate curing step might be necessary.

Fourthly, the molding pins 23 are detached from the male mold part 21, the male mold part 21 is detached from the female mold part 22, and the first side plates 222 and two second side plates 223 are detached from the bottom plate 221. The molded main body 11 is then separated from the female mold part 22. The detachment of the molding pins 23 establishes the locations of the positioning holes 14, through which the positioning pins 12 may then be inserted. As such, no machining step is required to form such holes 14, and the desired alignment thereof, relative to the rest of the mold assembly 20, is assured.

Finally, the molded main body 11 is then fixed on a machine. A plurality of positioning pins 12 are inserted into the positioning holes 14, thus forming an inspection fixture 10. The positioning pins 12 can be produced using a computerized numerical control process.

It should be understood, the molded main body 11 can be further processed via polishing, spray coating, and/or vacuum deposition. In the polishing process of the main body, the female mold part 22 can function as a fixture of the molded main body 11. The molded main body 11 is fixed in the female mold part 22 for preventing deformation.

It should be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making an inspection fixture, comprising steps of:
    providing a detachable mold assembly, the mold assembly including a male mold part, and a female mold part engaged with the male mold part, the male mold part including a mold plate, a mold core, and a plurality of receiving holes extending through the mold plate and the mold core;
    pouring fluid into the mold and inserting a plurality of molding pins into the receiving holes;
    solidifying the fluid in the mold assembly and forming a part with a plurality of positioning holes in the mold assembly, the molding pins establishing the respective locations of the positioning holes;
    detaching the mold assembly and removing the part from the mold assembly; and
    mounting a plurality of positioning pins in the positioning holes.

2. The method for making an inspection fixture as claimed in claim 1, wherein the fluid is a melted resin.

3. The method for making an inspection fixture as claimed in claim 2, wherein the melted resin has a total contraction in an approximate range from 0.1% to 0.4%.

4. The method for making an inspection fixture as claimed in claim 1, wherein the fluid is gypsum.

5. The method for making an inspection fixture as claimed in claim 1, wherein the female mold part includes a bottom plate, two opposite first side plates, and two opposite second side plates; and the two first side plates and two second side plates are detachably joined with the bottom plate and define a mold cavity corresponding to the mold core.

6. The method for making an inspection fixture as claimed in claim 5, wherein the two second side plates are lower than the first side plates.

7. The method for making an inspection fixture as claimed in claim 5, wherein two first threaded holes are defined in the male mold plate, the first threaded holes are positioned adjacent to two ends of the mold core, respectively, and each first side plate has a second threaded hole positioned corresponding to one of the first threaded holes.

8. The method for making an inspection fixture as claimed in claim 1, wherein the male mold part is made of aluminum.

9. The method for making an inspection fixture as claimed in claim 1, wherein the female mold part is made of steel.

10. The method for making an inspection fixture as claimed in claim 1, wherein the fluid is agitated in a vacuum to expel air contained in the fluid, before being poured in the mold.

11. The method for making an inspection fixture as claimed in claim 1, wherein the fluid is solidified at room temperature for about one hour.

* * * * *